United States Patent Office 3,112,286
Patented Nov. 26, 1963

3,112,286
NOVEL ORGANO PHOSPHOROUS ANTIOXIDANT-STABILIZERS AND STABILIZED COMPOSITIONS CONTAINING SAME
Roger E. Morris, Cuyahoga Falls, and Ray D. Taylor, Brecksville, Ohio, assignors to The B. F. Goodrich Company, New York, N.Y., a corporation of New York
No Drawing. Filed Sept. 21, 1961, Ser. No. 139,587
12 Claims. (Cl. 260—29.7)

This invention relates to novel organo phosphorous compounds and more particularly pertains to novel organic phosphite esters and to stabilized rubber compositions containing same.

The preparation of certain tri-aryl phosphite esters and their use as stabilizers is known. See, for instance, U.S. Patents Nos. 2,220,113; 2,220,845; 2,246,059; 2,419,354; 2,612,488; 2,732,365; 2,733,226 and 2,877,259.

An object of this invention is the provision of novel compounds having combined stabilizer-antioxidant activity. Another object is the provision of novel stabilized rubber latex. Still another object is the provision of novel rubber vulcanizates which are stabilized against attack by atmospheric oxygen.

That these and other objects have been accomplished by the present invention will become apparent to those skilled in the art upon a careful reading of the following description and examples.

The novel organic phosphite esters embodied herein have the structure $$\left[ H-O-\underset{\underset{R}{|}}{\bigcirc}-\underset{\underset{CH_3}{|}}{\overset{CH_3}{\underset{|}{C}}}-\underset{\underset{R_1}{|}}{\bigcirc}-O-\right]_x P\left[-O-\underset{\underset{R_2}{|}}{\bigcirc}\right]_y$$

wherein R represents a bulky hydrocarbon group such as t-butyl, t-amyl, t-hexyl, cyclohexyl, t-pentyl, t-octyl, phenyl, and the like; $R_1$ represents hydrogen and R; $R_2$ represents an alkyl group having from 6 to 20 carbon atoms which is preferably in the meta or para position; $x$ represents a number of from 1 to 3 inclusive; $y$ represents a number of from 0 to 2 inclusive and the sum of the numerical value of $x+y$ is always exactly 3. Most preferred are compounds of the foregoing formula wherein R is a tertiary alkyl group having from 4 to 8 carbon atoms; $R_1$ is a member selected from the group consisting of hydrogen and R; $R_2$ is an alkyl group having from 8 to 12 carbon atoms; $x$ is a number of from 1 to 3 inclusive and $y$ is a number of from 0 to 2 inclusive and the sum of the numerical value of $x+y$ is always exactly 3. Even more highly preferred are compounds of the foregoing type wherein $x$ is a number of from 1 to 2 inclusive and $y$ is a number of from 1 to 2 inclusive and the sum of the numerical value of $x+y$ is always exactly 3.

The following reaction illustrates one method for preparing the compositions embodied herein.

$$PCl_3 + \left(HO-\underset{\underset{R_2}{|}}{\bigcirc}\right)_y \longrightarrow \left(Cl\right)_{3-y}-P-\left[-O-\underset{\underset{R_2}{|}}{\bigcirc}\right]_y$$

$$\left(Cl\right)_{3-y}-P-\left[-O-\underset{\underset{R_2}{|}}{\bigcirc}\right]_y + \left(HO-\underset{\underset{R}{|}}{\bigcirc}-\underset{\underset{CH_3}{|}}{\overset{CH_3}{\underset{|}{C}}}-\underset{\underset{R_1}{|}}{\bigcirc}-OH\right)_x \longrightarrow$$

$$\left[HO-\underset{\underset{R}{|}}{\bigcirc}-\underset{\underset{CH_3}{|}}{\overset{CH_3}{\underset{|}{C}}}-\underset{\underset{R_1}{|}}{\bigcirc}-O-\right]_x P\left[-O-\underset{\underset{R_2}{|}}{\bigcirc}\right]_y$$

wherein R, $R_1$, $R_2$, $x$ and $y$ have the aforementioned designations.

The novel organic phosphite esters embodied herein are useful as stabilizers which are most useful when incorporated into natural and synthetic diene rubber latex prior to coagulation and drying of the rubber. In addition to this these esters, unlike any of the known phosphite ester stabilizers, are very efficient antioxidants in the subsequently vulcanized rubber.

The prior art phosphite esters such as triphenyl phosphite and the alkylated triaryl phosphites have been incorporated into rubber latex, and particularly GR-S or SBR type of synthetic rubber latex prior to isolation of the rubber. The prime function of such stabilizers is the prevention of darkening deterioration and resinification of the polymer which is liable to occur when the coagulant is subjected to the elevated temperatures of the drying operation during manufacture. So great is the susceptibility of improperly stabilized unvulcanized SBR to oxidative deterioration at elevated temperatures that instances are known wherein the polymer has actually ignited during the drying operation. The prior art aryl phosphites and the novel phosphites embodied herein are very effective in preventing this type of degradation.

Prior to the present invention it was necessary to use one type of a stabilizer in diene rubber latex to prevent the aforesaid darkening and resinification of the rubber after it is coagulated while it is being dried and then to employ a second different type of a compound as an antioxidant in the vulcanizate recipe employing the stabilized rubber. The aforementioned triaryl phosphites and alkylated triphenyl phosphites are known to be useful as stabilizers for the raw rubber only, and to be of little or no value as antioxidants in rubber vulcanizates. The present invention is indeed unobvious and unexpected in that it has obviated the use of the heretofore necessary combination of separate stabilizer and separate antioxidant in the isolation and vulcanization of diene rubbers.

The novel combined stabilizer-antioxidants embodied herein have unusually good resistance to hydrolysis and they can be emulsified in water and stored for long periods of time without loss of activity or breaking of the emulsion. It is indeed unobvious and unexpected that the stabilizer antioxidants embodied herein are far superior in resistance to hydrolysis than the aforementioned known triaryl phosphite stabilizers.

The novel, stable rubber compositions embodied herein comprise a mixture of 100 parts by weight of a diene rubber and from about 0.01 to about 5 parts by weight of the aforementioned novel organic phosphite ester. More preferred are the compositions containing from about 0.25 to about 2 parts by weight of the organic phosphite ester per 100 parts by weight of the diene rubber.

The diene rubbers embodied herein include rubbery materials having available unsaturation, such as the natural and synthetic vulcanized rubbers and the rubbery polymers of dienes, preferably of open-chain conjugated dienes having from 4 to 8 carbon atoms. Specific examples of rubbery materials useful in this invention are natural rubber, which is essentially a polymer of isoprene, polybutadiene-1,3, polyisoprene, poly-2,3-dimethyl-butadiene-1,3, poly-2-chlorobutadiene-1,3, and the like, the "synthetic natural" rubbers such as cis-1,4-head-to-tail polyisoprene and other polymers obtained from 1,3-dienes by means of directive polymerization, or the rubbery copolymers, terpolymers and the like of these and similar conjugated dienes with each other or with at least one copolymerizable monomer such as isobutylene, styrene, acrylonitrile, methyl acrylate, ethyl acrylate, butyl acrylate, methyl methacrylate, 2-vinyl pyridine, 4-vinyl pyridine, and the like.

The polymeric diene rubbers embodied herein generally contain at least 50% by weight of the diene and preferably contain from about 55 to 85% by weight of the diene. However, copolymers, terpolymers and other multicomponent polymers containing as little as 35% or less by weight of diene can also be employed. For example, polymers of about 35% by weight of butadiene-1,3, about 35% styrene and about 30% acrylonitrile, polymers of about 97% isobutylene and about 3% isoprene can be used. For the purposes of this invention balata and gutta percha, which are polyisoprene isomers, and the like which contain available unsaturation are to be considered as curable rubbers.

Still other rubbery materials can be used in the practice of this invention such as unsaturated polymers containing acid groups obtained by the copolymerization of a major amount of an open-chain aliphatic conjugated diene with an olefinically unsaturated carboxylic acid, by the reaction of a polymer of a diene with a carboxyl supplying reagent preferably in the presence of a catalyst, by the copolymerization of a diene with an olefinically unsaturated copolymerizable compound hydrolyzable to form an acid group and by copolymerization of an alkyl ester of an acrylic type acid with a polyolefinically unsaturated carboxylic acid. Still other rubbers can be employed such as polymers formed by the copolymerization of dienes with alkyl acrylates and by the polymerization of an alkyl acrylate with at least one other poly-olefinically unsaturated monomer followed by hydrolysis.

Rubbery polyesterurethanes, polyetherurethanes, and polyesteramideurethanes having curable double bonds or available unsaturation and rubber reclaimed from the foregoing can also be used. Mixtures of two or more of the foregoing rubbers may be employed as ingredients in the vulcanizates of this invention. The preferred rubbers are the natural and synthetic polyisoprenes, the polybutadienes, the polychloroprenes, and the copolymers of isobutylene with isoprene, butadiene-1,3 and styrene, and butadiene-1,3 with acrylonitrile. Most preferred are the rubbery copolymers of butadiene-1,3 and styrene.

In the following illustrative examples the amounts of ingredients used are expressed as parts by weight unless otherwise indicated.

EXAMPLE I

An antioxidant-stabilizer composition having predominantly the structure

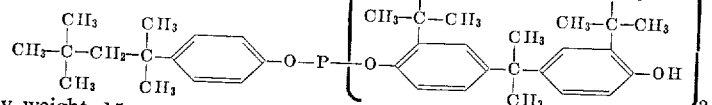

was prepared in the following manner:

Three hundred and sixty-six grams (2.6 moles) of PCl$_3$ were placed in a dry, three-necked flask equipped with a mechanical stirrer, reflux condenser and a stopper. To the flask were then added 206.3 g. (1.0 mole) of p-octyl phenol (prepared by the alkylation of phenol with diisobutylene) and the resulting mixture was stirred at 65° C. Hydrogen chloride gas evolved rapidly as the reaction proceeded. The evolution of HCl stopped in 150 minutes. The condenser was replaced by a short distilling head and excess PCl$_3$ was flashed off. The product weighed 300 g. (98% of theory) was the colorless liquid dichloro p-octylphenyl phosphite.

A solution of sixty-eight grams of di-(t-butyl)-bis-phenol-A in 206 g. of benzene was placed in a 3-necked flask fitted with a mechanical stirrer, distilling head and a gas bubble tube. To this were added 30.7 g. of the above-described dichloro p-octylphenyl phosphite with continuous stirring. The benzene was then removed by distillation and dry nitrogen was passed through the reaction mixture to facilitate the removal of HCl gas.

The reaction mixture was then heated slowly over a three hour period to a maximum temperature of 200° C. and was then maintained at a temperature of from 190 to 200° C. for about 40 minutes. The product was then cooled to room temperature and became a brittle, transparent pale yellow solid which was easily ground to a fine white powder by conventional means. The yield was 87.2 g. or 95% of theory.

In a manner similar to that outlined above using the proper molecular proportions of the various reactants several other stabilizers which appear in Table 1 were prepared.

EXAMPLE II

Twelve and one-half grams of the solid stabilizer of Example I were placed in an 8 oz. jar, the jar was half filled with small flint stones. The jar was sealed and the jar and contents were rotated on a roller mill for 24 hours. The jar was opened and 50 ml. of a 2½% aqueous solution of sodium stearate was added and the milling was continued for an additional two hours. The resulting fine suspension of stabilizer in water was decanted from the stones into 5 liters of SBR (styrene-butadiene rubber) 1511 latex containing 1000 g. of rubber. SBR 1511 is a "cold" copolymer containing about 23½% by weight of styrene and the remainder is butadiene. This copolymer is more fully described in Rubber World, vol. 130, No. 5, page 647 (1954). Additional distilled water was added to give a total volume of 10 liters to the mixture and 1760 ml. of a 20% aqueous solution of sodium chloride were added slowly to the mixture with stirring. An additional 1650 ml. of an aqueous solution of 3% sodium chloride and 1% sulfuric acid were then added slowly with vigorous stirring of the mixture. The mixture was then stirred for 20 minutes at 50° C.

The crumb rubber which resulted from the above procedure was isolated by filtration and was washed 4 times with distilled water. The rubber was then dried at 50° C. at reduced pressure.

In addition to the foregoing it is sometimes more convenient to dissolve the stabilizer in from 25 to 30% of a light paraffinic oil. This produces a viscous liquid which is then emulsified in a 2½ sodium stearate solution with a Waring Blendor. The resulting emulsion is then incorporated into the rubber latex as described above.

Mooney viscosities were determined for SBR 1511 samples stabilized with the specified amounts of stabilizer as described above. The Mooney viscosity value for the original and aged rubber appear in Table 1. The amounts of stabilizer used in the samples appearing in Table 1 are expressed as parts of stabilizer per 100 parts of rubber.

```
Zinc oxide _____  5
Stearic acid _____  3
EPC carbon black _____ 50
Altax (di-2-benzothiazyl disulfide) _____  1
```

To the above was then added on the mill

```
Sulfur _____  3
Antioxidant _____  1
```

Table 1
STABILIZATION OF SBR 1511 RUBBER

| Parts | Stabilizer | Mooney Viscosity (4 min.) Change Samples Aged at 105° C. in Air for— ||||||
|---|---|---|---|---|---|---|---|
| | | 0 day | ½ day | 1 day | 2 days | 4 days | 6 days |
| | None (control) | 44 | +14 | +26 | +36 | +48 | ** |
| 1.25 | 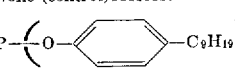 | 40 | −8 | −10 | −9 | +1 | +19 |
| 1.25 | 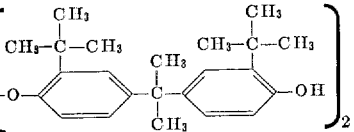 | 39 | −2 | −5 | −7 | −4 | +3 |
| 1.25 | 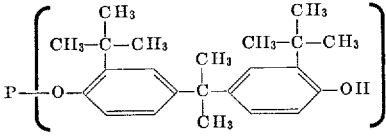 | 37 | −13 | −3 | +3 | +8 | ** |
| 1.25 | 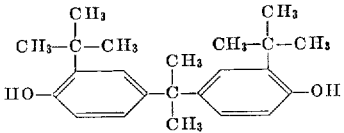 | 37 | −10 | +5 | +13 | +25 | ** |
| 1.25 | 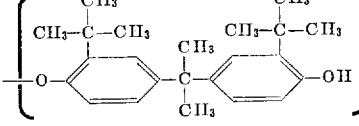 | 32 | +2 | +2 | +2 | +3 | +3 |
| 0.94 | do | 32 | −1 | −1 | +1 | +3 | +5 |
| 0.88 | do | 44 | −3 | −9 | −4 | +6 | +16 |
| 0.75 | do | 32 | −7 | −7 | +4 | +6 | +12 |
| 0.50 | do | 32 | −3 | −4 | +3 | +10 | +14 |
| 1.25 | 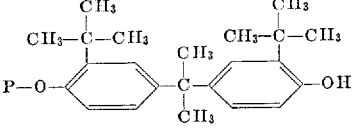 | 32 | +3 | +1 | 0 | +6 | +12 |
| 0.94 | do | 45 | −2 | −4 | −4 | +7 | +15 |
| 0.88 | 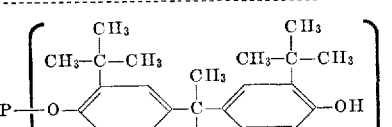 | 46 | −2 | −7 | −4 | +3 | +13 |
| 0.88 | 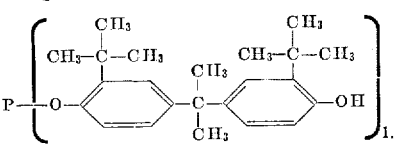 | 46 | −1 | −7 | −6 | −1 | +11 |

*Nonyl phenol is the reaction product of phenol and propylene trimer.
**Values not determined.

EXAMPLE III

A natural rubber-black masterbatch was prepared from the following recipe:

Natural rubber _____ 100 and the resulting stocks were cured at 140° C. for various lengths of time shown in Table 2. The cured samples were aged in air for 24 hours at 100° C. and the stress-strain properties were compared with the properties of the unaged vulcanizate (Table 2).

Table 2

| Antioxidant | 50' Cure Tensile p.s.i. Samples Aged at 100 °C. for— | | |
|---|---|---|---|
| | 0 hour | 24 hours | 48 hours |
| None | 4,020 | 3,100 (70% retention) | 1,850 (42% retention) |
| P—[O—⌬(C(CH₃)₃)—C(CH₃)₂—⌬(C(CH₃)₃)—OH]₃ (tri-ester of phosphite with bis-phenol containing t-butyl groups and C(CH₃)₂ bridge) | 4,470 | 3,850 (86% retention) | 3,460 (77% retention) |
| P—(⌬—C₉H₁₉)₃ | 4,320 | 3,140 (73% retention) | 1,760 (41% retention) |
| HO—⌬(C(CH₃)₃)—C(CH₃)₂—⌬(C(CH₃)₃)—OH (bis-phenol with t-butyl groups and C(CH₃)₂ bridge) | 4,480 | 3,880 (87% retention) | 3,300 (74% retention) |
| P—[O—⌬—C₈H₁₇][O—⌬(C(CH₃)₃)—C(CH₃)₂—⌬(C(CH₃)₃)—OH]₂ | 4,300 | 3,870 (90% retention) | 2,900 (67% retention) |

EXAMPLE IV

Stabilizers of the type embodied herein as well as a known stabilizer were emulsified in water and the stability of the emulsions upon standing at 100° F. were determined. The emulsions contained 20% solids and a standard amount of potassium oleate was used as the emulsifier. Stabilizers B and C below were in the form of liquids containing 25% by weight of a paraffinic oil respectively. The emulsions each was made up to an initial pH of from 11.6 to 11.7. The emulsion broke when a clear oil layer appeared on top which could not be redispersed on stirring.

| | Stabilizer | Days to Break |
|---|---|---|
| A | P—(⌬—C₉H₁₉)₃ | 7 |
| B | P—[O—⌬—C₉H₁₉]₁ [O—⌬(C(CH₃)₃)—C(CH₃)₂—⌬(C(CH₃)₃)—OH]₂ | >21 |
| C | P—[O—⌬—C₉H₁₉]₁ [O—⌬(C(CH₃)₃)—C(CH₃)₂—⌬(C(CH₃)₃)—OH]₂ | 21 |

In a manner similar to that given in Example II emulsion samples B and C above which had been aged for 15 days at 100° F. were used to stabilize SBR 1511 and Mooney viscosities were determined on rubber containing 0.938 parts of stabilizer per 100 parts of rubber and the results are given in Table 3.

Table 3

| Stabilizer | Mooney Viscosity (4 min.) Change Samples Aged at 105° C. in Air for— | | | | | |
|---|---|---|---|---|---|---|
| | 0 day | ½ day | 1 day | 2 days | 4 days | 6 days |
| B | 34 | −7 | −6 | +1 | +6 | +10 |
| C | 34 | −4 | −8 | −2 | +5 | +8 |

We claim:

1. A rubbery polymer of an open chain conjugated diene stabilized with from about 0.01 to about 5 percent by weight based on said polymer of a compound having the structure

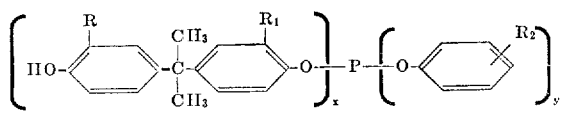

wherein R is a radical selected from the group consisting of phenyl, cyclohexyl and tertiary alkyl groups containing from 4 to 8 carbon atoms; $R_1$ is a member selected from the group consisting of hydrogen and R; $R_2$ is an alkyl group having from 6 to 20 carbon atoms; $x$ represents a number from 1 to 3 inclusive; $y$ represents a number from 0 to 2 inclusive and the numerical value of $x+y$ is always 3.

2. An aqueous emulsion of 100 parts by weight of a rubbery polymer of isoprene stabilized with from about 0.25 to about 2 parts by weight of a compound having the structure

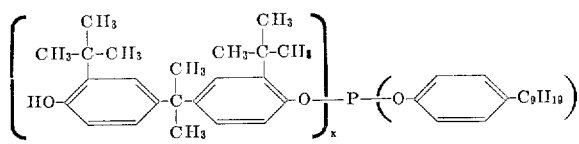

wherein $x$ is a number of from 1 to 3 inclusive; $y$ is a number of from 0 to 2 inclusive and the numerical value of $x+y$ is exactly 3.

3. An aqueous emulsion of 100 parts by weight of a rubbery polymer of isoprene stabilized with from about 0.25 to about 2 parts by weight of a compound having the structure

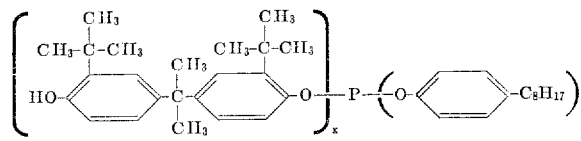

wherein $x$ is a number of from 1 to 3 inclusive; $y$ is a number of from 0 to 2 inclusive and the numerical value of $x+y$ is exactly 3.

4. An aqueous emulsion of 100 parts by weight of a rubbery copolymer of butadiene-1,3 and styrene stabilized with from about 0.25 to about 2 parts by weight of a compound having the structure

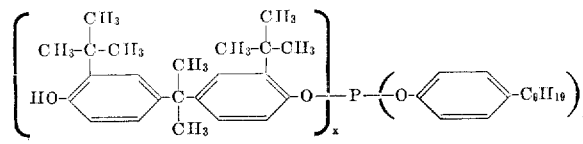

wherein $x$ is a number of from 1 to 3 inclusive; $y$ is a number of from 0 to 2 inclusive and the numerical value of $x+y$ is exactly 3.

5. An aqueous emulsion of 100 parts by weight of a rubbery copolymer of butadiene-1,3 and styrene stabilized with from about 0.25 to about 2 parts by weight of a compound having the structure

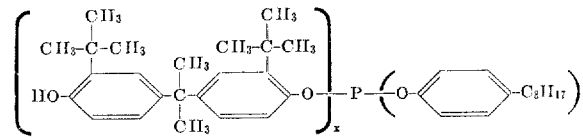

wherein $x$ is a number of from 1 to 3 inclusive; $y$ is a number of from 0 to 2 inclusive and the numerical value of $x+y$ is exactly 3.

6. A vulcanizate of a rubbery polymer of isoprene stabilized against attack by atmospheric oxygen containing from about 0.25 to about 2 parts by weight per 100 parts of polymer of a compound having the structure

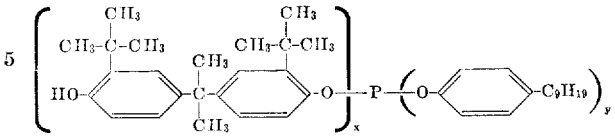

wherein $x$ is a number of from 1 to 3 inclusive; $y$ is a number of from 0 to 2 inclusive and the numerical value of $x+y$ is exactly 3.

7. A vulcanizate of a rubbery polymer of isoprene stabilized against attack by atmospheric oxygen containing from about 0.25 to about 2 parts by weight per 100 parts of polymer of a compound having the structure

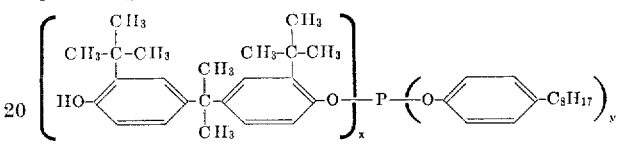

wherein $x$ is a number of from 1 to 3 inclusive; $y$ is a number of from 0 to 2 inclusive and the numerical value of $x+y$ is exactly 3.

8. A vulcanizate of a rubbery copolymer of butadiene-1,3 and styrene stabilized against attack by atmospheric oxygen containing from 0.25 to about 2 parts by weight per 100 parts of copolymer of a compound having the structure

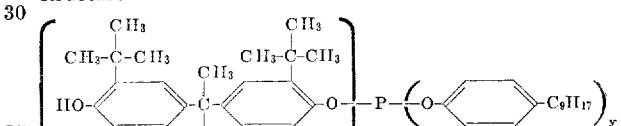

wherein $x$ is a number of from 1 to 3 inclusive; $y$ is a number of from 0 to 2 inclusive and the numerical value of $x+y$ is exactly 3.

9. A vulcanizate of a rubbery copolymer of butadiene-1,3 and styrene stabilized against attack by atmospheric oxygen containing from about 0.25 to about 2 parts by weight per 100 parts of copolymer of a compound having the structure

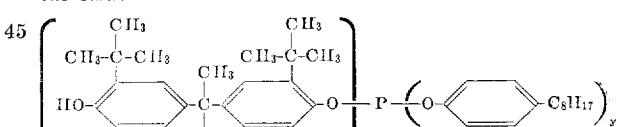

wherein $x$ is a number of from 1 to 3 inclusive; $y$ is a number of from 0 to 2 inclusive and the numerical value of $x+y$ is exactly 3.

10. A compound having the structure

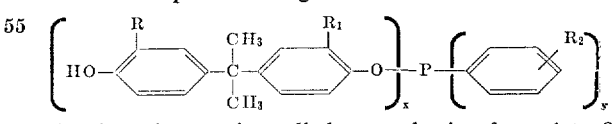

wherein R is a tertiary alkyl group having from 4 to 8 carbon atoms; $R_1$ is a member selected from the group consisting of hydrogen and R; $R_2$ is an alkyl group having from 8 to 12 carbon atoms; $x$ is a number of from 1 to 3 inclusive; $y$ is a number of from 0 to 2 inclusive and the sum of the numerical value of $x+y$ is always exactly 3.

11. A compound having the structure

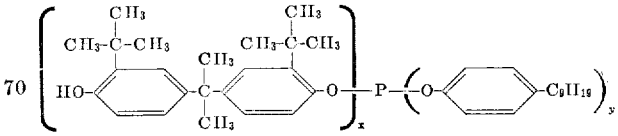

wherein $x$ is a number of from 1 to 2 inclusive and $y$ is a number of from 1 to 2 inclusive and the numerical value of $x+y$ is exactly 3.

12. A compound having the structure
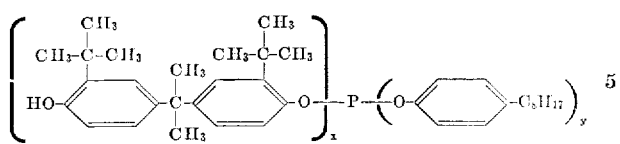
wherein $x$ is a number from 1 to 2 inclusive and $y$ is a number from 1 to 2 inclusive and the numerical value of $x+y$ is exactly 3.
References Cited in the file of this patent
UNITED STATES PATENTS
2,058,394    Arvin ---------------- Oct. 27, 1936

UNITED STATES PATENT OFFICE
CERTIFICATE OF CORRECTION

Patent No. 3,112,286　　　　　　　　　　　November 26, 1963

Roger E. Morris et al.

It is hereby certified that error appears in the above numbered patent requiring correction and that the said Letters Patent should read as corrected below.

Column 2, line 36, for "syntheic" read -- synthetic --; column 7, Table 2, first column, the second formula thereof should appear as shown below instead of as in the patent:

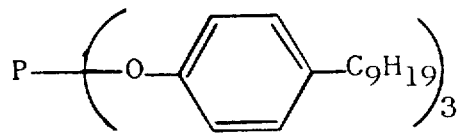

same Table 2, first column, the fourth formula thereof should appear as shown below instead of as in the patent:

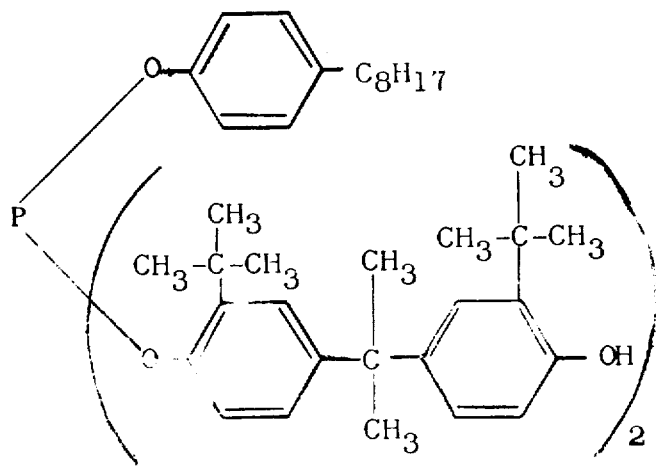

column 7, in the table at the bottom of the column, second column, the first formula should appear as shown below instead of as in the patent:

same table, second column, the third formula should appear as shown below instead of as in the patent:

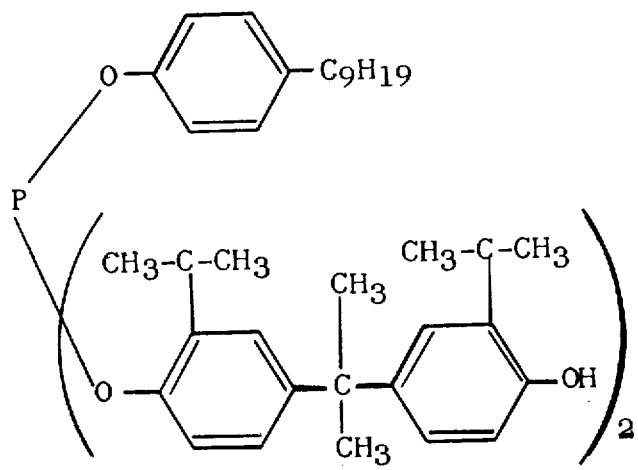

same table, third column, line 3 thereof, for "21" read -- >21 --; column 10, lines 55 to 58, the formula should appear as shown below instead of as in the patent:

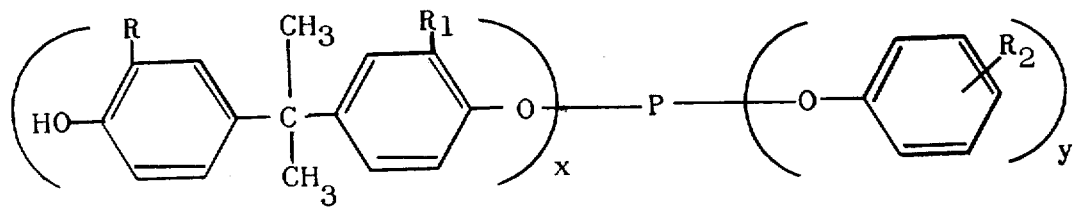

Signed and sealed this 18th day of August 1964.

(SEAL)
Attest:

ERNEST W. SWIDER
Attesting Officer

EDWARD J. BRENNER
Commissioner of Patents